United States Patent
Barber et al.

(10) Patent No.: US 6,739,624 B2
(45) Date of Patent: May 25, 2004

(54) FRAME ASSEMBLY FOR A MOTOR VEHICLE

(75) Inventors: Mark W. Barber, St. Thomas (CA); John Dicesare, London (CA); Ashwani K. Aggarwal, Ann Arbor, MI (US); Robert M. Kaminski, Clarkston, MI (US); Gianfranco Gabbianelli, Troy, MI (US); Frank A. Horton, Rochester Hills, MI (US); William Perry, Shelby Township, MI (US); Richard Ashley, Berkley, MI (US)

(73) Assignee: Magna International Inc., Aurora (CA)

( * ) Notice: Subject to any disclaimer, the term of this patent is extended or adjusted under 35 U.S.C. 154(b) by 98 days.

(21) Appl. No.: 10/091,600

(22) Filed: Mar. 7, 2002

(65) Prior Publication Data

US 2002/0149189 A1 Oct. 17, 2002

Related U.S. Application Data

(63) Continuation-in-part of application No. 09/556,432, filed on Apr. 24, 2000, now Pat. No. 6,533,348, which is a continuation-in-part of application No. 09/173,554, filed on Oct. 16, 1998, now Pat. No. 6,092,865.
(60) Provisional application No. 60/273,949, filed on Mar. 8, 2001, provisional application No. 60/273,834, filed on Mar. 8, 2001, and provisional application No. 60/062,204, filed on Oct. 16, 1997.

(51) Int. Cl.[7] ............................................. B62D 21/00
(52) U.S. Cl. .............................. 280/781; 280/124.109
(58) Field of Search ............................. 180/311, 312; 280/124.109, 781, 790, 800, 785; 296/29, 204, 205; 29/897.2

(56) References Cited

U.S. PATENT DOCUMENTS

| | | | | |
|---|---|---|---|---|
| 1,853,141 A | * | 4/1932 | Overholtz | 40/624 |
| 4,327,938 A | | 5/1982 | Geissler et al. | 280/784 |
| 4,406,343 A | * | 9/1983 | Harasaki | 180/297 |
| 4,453,740 A | * | 6/1984 | von der Ohe et al. | 280/781 |
| 4,641,870 A | | 2/1987 | Heyman | 293/102 |
| 4,684,151 A | | 8/1987 | Drewek | 280/784 |
| 5,308,115 A | * | 5/1994 | Ruehl et al. | 280/785 |
| 5,332,281 A | * | 7/1994 | Janotik et al. | 296/209 |
| 5,372,400 A | | 12/1994 | Enning et al. | 296/203.03 |
| 5,403,063 A | * | 4/1995 | Sjostedt et al. | 296/193.07 |
| 5,458,393 A | | 10/1995 | Benedyk | 296/203.01 |
| 5,549,352 A | | 8/1996 | Janotik et al. | 296/209 |
| 5,603,581 A | * | 2/1997 | Fujita et al. | 403/272 |

(List continued on next page.)

FOREIGN PATENT DOCUMENTS

| | | | |
|---|---|---|---|
| DE | 42 26 500 A1 | 2/1994 | |
| DE | 19929219 | 12/2000 | |
| EP | 0733538 | 9/1996 | |
| JP | 03086689 A * | 4/1991 | B62D/25/20 |
| JP | 06-001260 | 1/1994 | |
| JP | 11-342863 | 12/1999 | |
| JP | 2000-142279 | 5/2000 | |

Primary Examiner—Paul N. Dickson
Assistant Examiner—Laura B. Rosenberg
(74) Attorney, Agent, or Firm—Pillsbury Winthrop LLP

(57) ABSTRACT

An assembly of supporting members includes a first member overlapping a second member and positioned within a hollow interior of the second member. The hollow interior of the second member has a flange on which the first member rests. A leading edge of the first member may have a protrusion extending away from the first member towards the flange of the second member to protect the flange and the connection between the first and second members. The first and second members may be hydroformed with the protrusion being an integral element of the first member.

11 Claims, 7 Drawing Sheets

U.S. PATENT DOCUMENTS

| | | | |
|---|---|---|---|
| 5,609,385 A | | 3/1997 | Daniel et al. ........... 296/187.05 |
| 5,609,386 A | | 3/1997 | Takahashi et al. .......... 296/204 |
| 5,634,663 A | | 6/1997 | Krupp et al. ............... 280/800 |
| 5,720,510 A | | 2/1998 | Daniel et al. .......... 296/187.05 |
| 5,725,247 A | * | 3/1998 | Nilsson et al. .............. 280/781 |
| 5,862,877 A | | 1/1999 | Horton et al. .............. 180/312 |
| 5,882,039 A | * | 3/1999 | Beckman et al. ........... 280/781 |
| 5,899,498 A | | 5/1999 | Horton ....................... 280/781 |
| 5,971,451 A | | 10/1999 | Huang ........................ 293/102 |
| 6,003,934 A | | 12/1999 | Usui ..................... 296/203.02 |
| 6,019,419 A | | 2/2000 | Browne et al. .......... 296/187.1 |
| 6,092,865 A | | 7/2000 | Jaekel et al. ................ 296/205 |
| 6,099,194 A | | 8/2000 | Durand ....................... 403/270 |
| 6,123,378 A | | 9/2000 | Teply et al. ................... 296/29 |
| 6,142,542 A | | 11/2000 | Sherno ........................ 293/132 |
| 6,161,867 A | | 12/2000 | Tamura ....................... 280/770 |
| 6,192,584 B1 | | 2/2001 | Gundlach et al. ........... 29/897.2 |
| 6,241,310 B1 | | 6/2001 | Patelczyk ................... 296/205 |
| 6,293,618 B1 | | 9/2001 | Sukegawa et al. .......... 296/209 |
| 6,302,478 B1 | | 10/2001 | Jaekel et al. ................ 296/205 |
| 6,309,011 B1 | | 10/2001 | Matsuyama et al. ... 296/187.05 |
| 2001/0000119 A1 | | 4/2001 | Jaekel et al. ................... 296/29 |
| 2001/0002760 A1 | | 6/2001 | Gabbianelli et al. ..... 296/146.9 |
| 2001/0007395 A1 | | 7/2001 | Gentile .................... 296/136.1 |
| 2001/0019215 A1 | | 9/2001 | Takahara ............... 296/187.05 |
| 2001/0040392 A1 | | 11/2001 | Yoshida ................. 296/203.02 |

* cited by examiner

FRAME ASSEMBLY FOR A MOTOR VEHICLE

This application is a continuation-in-part application of U.S. patent application Ser. No. 09/556,432 filed on Apr. 24, 2000, now U.S. Pat. No. 6,533,348, currently, which is a continuation-in-part application of U.S. patent application Ser. No. 09/173,554, filed on Oct. 16, 1998, now U.S. Pat. No. 6,092,865, which claims the benefit of U.S. Provisional Application Serial No. 60/062,204, filed on Oct. 16, 1997. The entire contents of each of the above-identified applications are hereby incorporated herein by reference thereto, respectively.

This application also claims the benefit of U.S. Provisional Application Serial Nos. 60/273,949, filed on Mar. 8, 2001, and 60/273,834 filed on Mar. 8, 2001, the entire contents of each also application being hereby incorporated herein by reference thereto, respectively.

FIELD OF THE INVENTION

The present invention relates generally to a frame assembly for a motor vehicle. More specifically, the invention relates to an improved joint for a frame assembly that may include a protective member.

BACKGROUND OF THE INVENTION

Typically, motor vehicle frame assemblies include lengthwise tubular frame members that are connected to transverse tubular frame members. These members are generally connected by either placing one member on top of another or by placing the end of the lengthwise member against the side of the transverse member. Then, the mating surfaces are welded.

This prior method of attaching tubular members is problematic since it is difficult to align the two members inasmuch as they only contact each other in a single plane. The longitudinal frame member must be precisely aligned with the transverse frame member to provide the proper contact points for welding and the correct orientation between the members.

Also, since prior art joints result in only one plane of connection, the joints are difficult to make structurally sound. Further, prior art joints often result in one tubular member being closed on both ends, which required holes to be made in the blocked frame members to permit protective coatings to be applied to the frame members.

Additionally, motor vehicle frame assemblies for automobiles generally support a bumper to protect the automobile against collisions. The bumper is typically positioned high enough off the ground so as to not to contact the ground during normal use of the automobile and to contact other automobiles. However, the bumper typically provides no protection if the automobile collides with a curb since the bumper is typically spaced well above the curb. If an automobile collides with a curb head on, the bumper can pass over the curb permitting the curb to contact and damage the underbody of the automobile, depending on the height of the curb and the underbody of the automobile. If the curb was to contact the frame of the automobile, serious damage could occur to the automobile frame. Not only would this provide a safety hazard, but damage to the frame could result in costly repairs and permanent damage to the structural integrity of the frame.

This invention addresses these needs in the art as well as other needs, which will become apparent to those skilled in the art once given this disclosure.

SUMMARY OF THE INVENTION

An object of the present invention is to provide an improved connection between frame members.

Another object of the present invention is to provide an improved joint between two hydroformed members.

Still another object of the present invention is to provide an improved joint between frame members that can facilitate alignment, increase surface contact area; and provide drainage for coating on the frame members.

Another object of the present invention is to provide an improved motor vehicle frame assembly that includes protective members.

A further object of the invention is to provide a joint for a motor vehicle frame that includes a protective member that protects the joint from collisions.

In accordance with the principles of the present invention, the foregoing objectives may be achieved by frame assembly for a motor vehicle, comprising a first frame member having a first surface facing a first direction and a second surface facing a second direction; and an overlapping frame member rigidly secured to the first frame member and having a first section and a flange protruding from the first section, the first section and the flange of the overlapping frame forming a recess having a shape corresponding to the first and second surfaces of the first member, the first member being received within the recess and mating with the first section and the flange of the overlapping frame member, the first section of the overlapping frame member abutting the first surface of the first frame member and the flange of the overlapping frame member overlapping and contacting the second surface of the first member, the overlapping frame member having a hollow interior, the flange having an end forming an opening communicating with the hollow interior, and the flange and the first frame member forming a passageway extending across the first frame member and between the opening and the hollow interior of the overlapping frame member.

In accordance with the principles of the present invention, the foregoing objectives may also be achieved by providing assembly of supporting members for a motor vehicle, comprising an upper member having a first surface and an opposite, second surface; and a lower member coupled to the upper member, the lower member having a central portion and a flange extending from the central portion in a first direction and forming an upwardly-open receiving cavity in the lower member, the flange having a leading edge lying in a first plane and facing towards the first direction, the lower member being positioned within the cavity of the lower member, the second surface of the upper member having a first section positioned within the cavity and overlapping the flange while being spaced from the first plane and a protrusion extending beyond the leading edge outside the receiving cavity with a portion of the protrusion positioned in the first plane to protect the leading edge from objects within the first plane and approaching the leading edge in a second direction, which is opposite the first direction.

In accordance with the principles of the present invention, the foregoing objectives may also be achieved by providing method of forming a frame assembly for a motor vehicle comprising forming an upper hydroformed frame member by a method comprising, providing a tubular metallic blank having a tubular metallic wall, placing the tubular metallic blank into a die cavity of a die assembly, the die cavity having die surfaces, and providing a high pressure fluid into an interior of the blank to expand the metallic wall of a central portion of the blank outwardly into conformity with the die surfaces of the die cavity to define a first section and a protrusion extending away from the first section; forming a lower hydroformed frame member by a method comprising, providing a tubular metallic blank having a tubular metallic wall, placing the tubular metallic blank into a die cavity of a die assembly, the die cavity having die surfaces, and providing a high pressure fluid into an interior of the blank to expand the metallic wall of a central portion of the blank outwardly into conformity with the die surfaces of the die cavity to define a central portion; forming a flange and an upwardly-open receiving cavity in the lower hydroformed frame member, the flange extending from the central portion in a first direction, the flange having a leading edge lying in a first plane and facing towards the first direction; and attaching the upper frame member to the lower frame member with the upper member being positioned within the cavity of the lower member, the first section of the upper member being positioned within the cavity and overlapping the flange while being spaced from the first plane and the protrusion of the upper member extending beyond the leading edge outside the cavity with at least a portion of the protrusion positioned in the first plane.

Other aspects, features and advantages of the present invention will become apparent from the following detailed description, the accompanying drawings, and the appended claims.

DETAILED DESCRIPTION OF THE ILLUSTRATED EMBODIMENTS OF THE INVENTION

Figure 1:
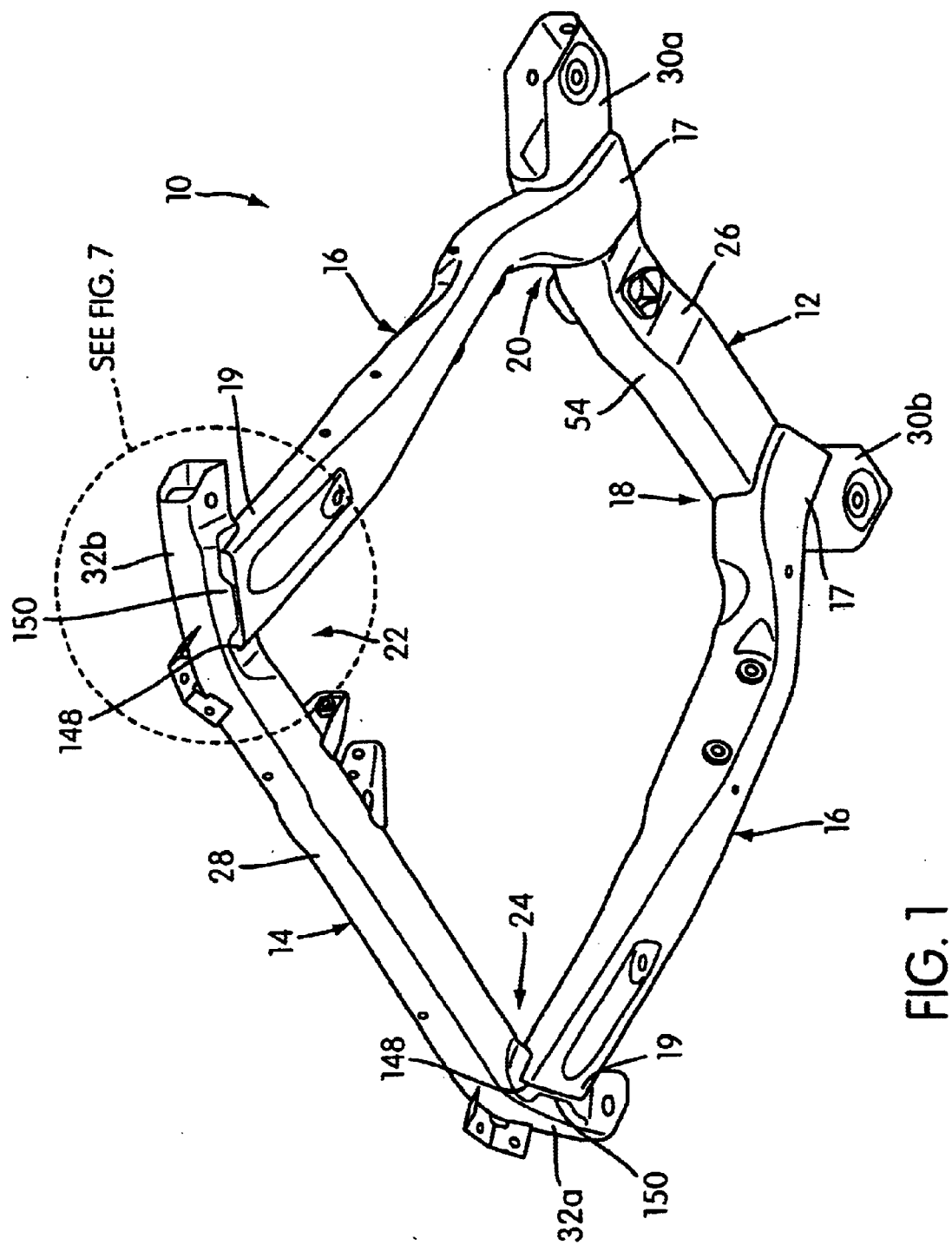
FIG. 1 is a bottom, front perspective view of the assembly of supporting structures according to an embodiment of the present invention.

In FIGS. 1–7, there is shown an assembly of supporting members, generally indicated at 10, according to the principles of the present invention. In the exemplary embodiment, the assembly of supporting members 10 is preferably in the form of a vehicle engine cradle assembly. The vehicle engine cradle assembly 10 comprises a rearward supporting member, generally indicated at 12, a forward supporting member, generally indicated at 14, and a pair of side supporting members or siderails, generally indicated at 16. The rearward and forward supporting members 12, 14 are elongated tubular, hollow frame rails laterally spaced from one another and interconnected in substantially parallel relation by opposite ends 17, 19 of the siderails 16 at respective rear overlapping joints 18, 20 and at respective front overlapping joints 22, 24.

The main members 12, 14 and 16 of the assembly 10 are preferably formed in a hydroforming process, which can permit the tubular, hollow rearward, forward supporting members 12, 14, and siderails 16, respectively, to have a substantially equal wall thickness throughout. In addition, during the hydroforming process, it is not necessary to provide a longitudinal seam weld, so that the tubular members 12, 14, 16 can be integrally formed, and can be stronger and more superior dimensionally to those which require seam welds, such as stamped or roll formed members. Preferably, the assembly 10 is adapted to have numerous vehicle components mounted thereon.

As illustrated, the rearward 12 and forward 14 supporting members and the siderails 16 have a hollow transverse cross-section, preferably substantially rectangular in form so as to provide sufficient strength and support for the assembly 10. The rear 12 and forward 14 supporting members are also preferably tubular and hollow in form for added torsional rigidity of the assembly 10.

Since the rearward 18, 20 and frontward 22, 24 overlap joints can be substantially the same in construction and operation, a description of the rearward overlap joints 18, 20 will suffice for both with respect to the general principles of the overlapping joints 18, 20, 22, and 24.

Figure 2:
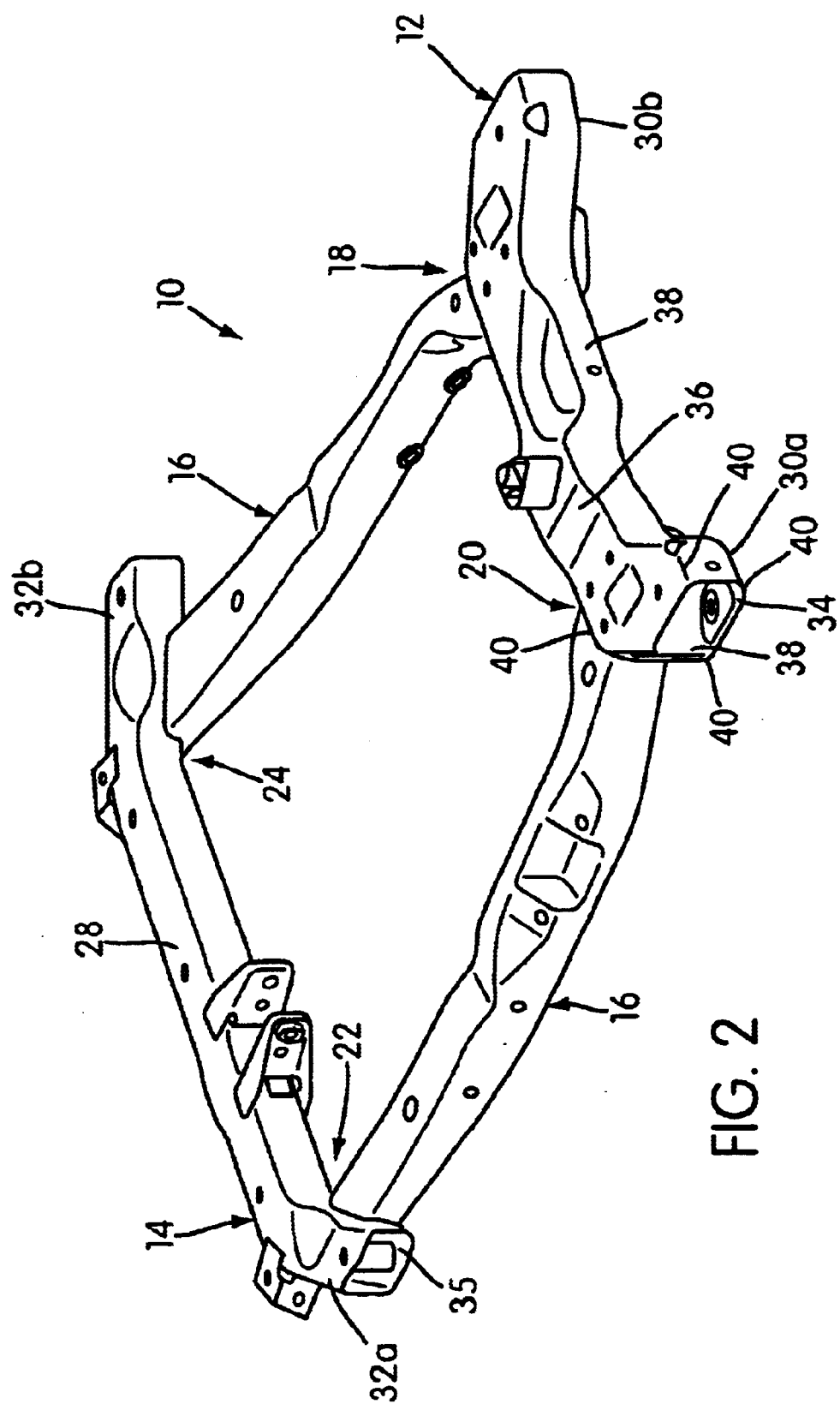
FIG. 2 is a top, front perspective view of the assembly of supporting structures in FIG. 1.
Figure 3:
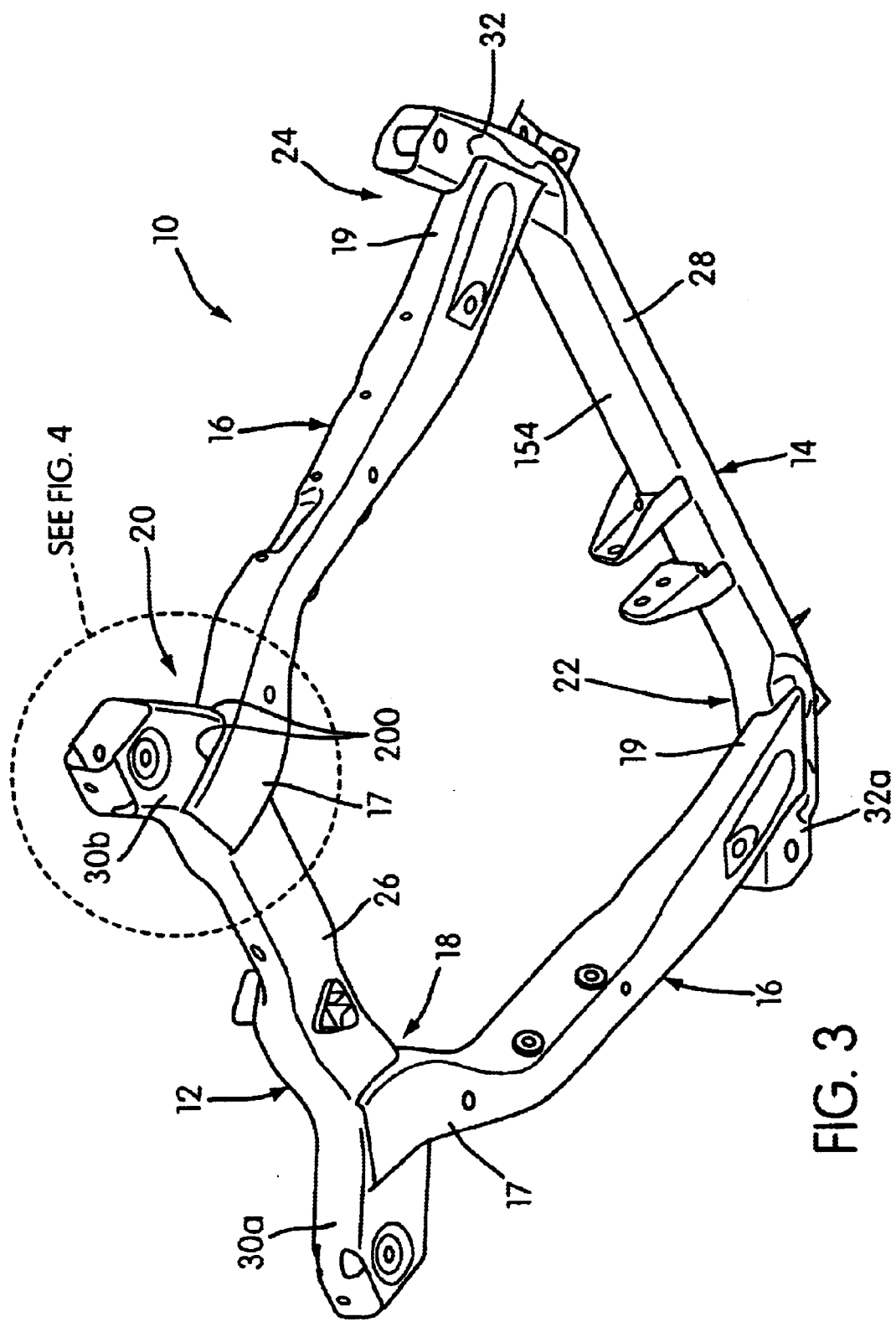
FIG. 3 is a bottom, rear perspective view of the assembly of supporting structures in FIG. 1.

FIGS. 1–3 show the rearward and forward supporting members 12, 14 having substantially similar construction and operation. Similar elements of each are shown with the same reference numerals.

The supporting members 12, 14 can have any appropriate configuration including a generally rectangular configuration. As illustrated, supporting members 12, 14 include a central section 26, 28, respectively. Substantially identical left and right end sections 30a and 30b extend in diverging relation from the central section 26, and substantially identical left and right end sections and 32a and 32b extend in diverging relation from the central section 28. Each section 30a, 30b of the rearward supporting member 12 includes a bottom portion 34, a top portion 36, and two side portions 38. As in FIG. 7, the forward supporting member 14 can have similar elements bottom portion 134, a top portion 136, and two side portions 138 that are shaped as necessary for the forward section of the cradle assembly 10.

Figure 4:
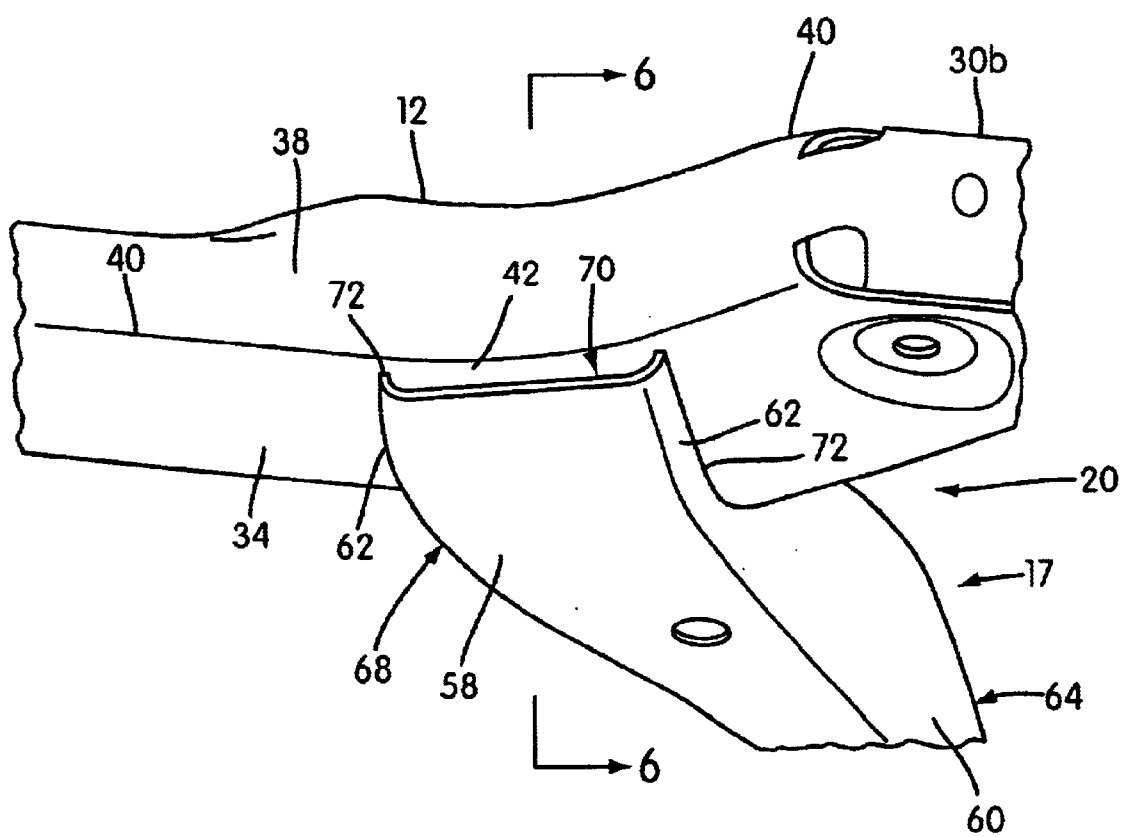
FIG. 4 is a bottom, rear, enlarged perspective view of one of the rear overlap joints shown in the detail indicated in FIG. 3.
Figure 5:
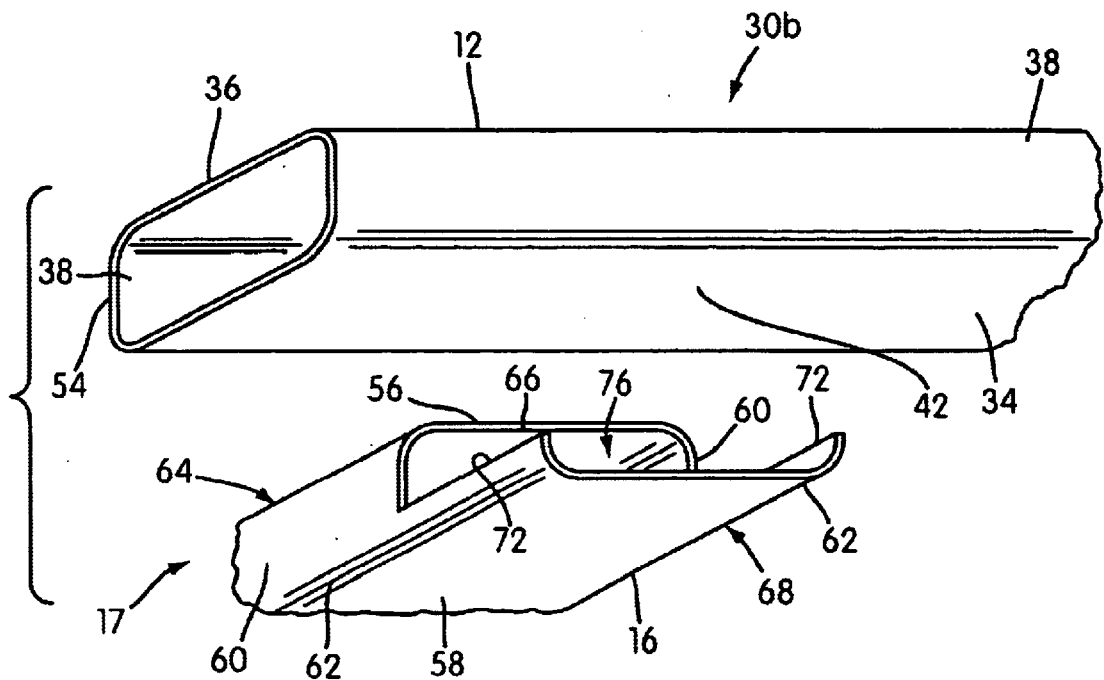
FIG. 5 is an exploded view of the assembly in FIG. 4 showing the rearward supporting member separated from one of the siderail members to more clearly show the recess in the siderail member.
Figure 6:
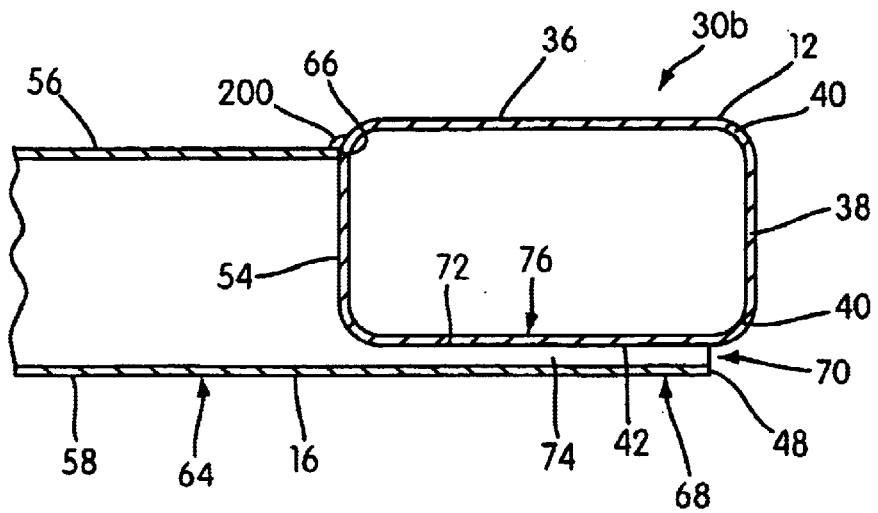
FIG. 6 is a cross-sectional view taken through line 6—6 of FIG. 4 which shows weld surfaces between the rearward supporting member and one of the siderail members.

As seen in FIGS. 5 and 6, each of bottom and top portions 34, 36 can be integrally formed with an arcuate corner portion 40 disposed on the opposite ends thereof. The corner portions 40 can be integrally formed with each side portion 38 therebetween such that the side portions 38 can be integrally disposed and in substantially perpendicular relation with the bottom and top portions 34 and 36 of the supporting member 12. In a preferred embodiment, as shown in FIGS. 3–6, the bottom portion 34 has a generally flat flange engaging surface 42 for engaging with siderail 16. Although the surface 42 is illustrated as being generally flat since its mating surface on supporting member 16 is generally flat, surface 42 can be any appropriate configuration and preferably corresponds to the configuration of the mating surface of the supporting member 16, such as surface 72.

The illustrated siderails 16 can be substantially identical to one another, as illustrated, or can be different from one another, as desired. The rearward ends 17 of siderails 16 can be connected to the rearward supporting member 12 by the overlap joints 18, 20 and the forward ends 19 of siderails 16 can be connected to the forward supporting member 14 by the overlap joints 22, 24, respectively.

The forward supporting member 14 and its corresponding overlap joints 22, 24 can include additional features such as skid features to protect the joints 22, 24 and the frame 10 from impact with curbs and other structures as discussed above. As seen in FIGS. 3–6, the illustrated siderails 16 can be similar to the supporting members 12 and 14 in that each siderail 16 can be formed by hydroforming as an integral, one-piece member. Since, in the illustrated embodiment, each of the siderails 16 can be substantially identical, only one siderail 16 and is corresponding joint with support member 12 will be discussed in detail. The ends 17, 19 of each siderail 16 can also be similar to form front overlap joints 18 and 20 that can be similar in at least basic overlapping relationship as illustrated with respect to rear joints 22 and 24. The end of each siderail 16 for use in one of rear joints 22 and 24, can include a top portion 56, a bottom portion 58, two side portions 60 and a plurality of arcuate corner portions 62. The bottom and top portions 56, 58 can be each integrally formed with one arcuate corner portion 62 disposed on the opposite ends thereof. One upper and lower corner portion 62 can be integrally formed with each side portion 60 therebetween such that each side portion 60 is integrally disposed and in substantially perpendicular relation with the bottom and top portions 56, 58. The upper portion 56, the adjacent corner portions 62, and the side portions 60 can constitute a body section 64 of the siderail 16. The body section 64 has a generally U-shaped siderail abutting end surface 66 facing the free end of the siderail and member 12.

The lower portion 58 and the adjacent corner portions 62 integrally extend from the body section 64 to form a flange 68. The flange 68 can be a generally U-shaped, one-piece element, that includes the leading edge 48 on the forward end thereof, which lies in a first plane and is oriented towards a first or forward direction. The flange 68 of each siderail 16 adjacent end sections 30a and 30b of member 12 overlaps the respective flange engaging surface 42 of end sections 30a and 30b.

An upper siderail receiving surface 72 of each corner portion 62 receives the siderail 16 and contacts the flange engaging surface 42. Preferably, the siderail receiving surfaces 72 are attached, for example, by welding, to the flange engaging surface 42 so as to provide structural rigidity and support to the assembly 10. As shown in FIGS. 4 and 6, the corner portions 62 of flange 68 contact the flange engaging surface 42 of member 12, and can define an opening 70 that leads to a passageway 74 between the interior of siderail 16 and the environment that is outside the siderail 16. The passageway 74 leads past member 12 and is partially formed by member 12, as seen in FIG. 6.

As seen in FIG. 6, the opening 70 spaces the lower portion 58 of siderail 16 from the flange receiving surface 42 of member 12, which in turn, defines the passageway 74. The passageway 74 extends between the opening 70 and the hollow interior of the siderail 16 and can allow fluids, such as coating material, to pass from the interior of the siderail 16 through the opening 70.

As seen in FIGS. 5 and 6, the end surface 66 of siderail 16 and the siderail receiving surface 72 of the flange 68 of siderail 16 cooperate to form a supporting member receiving recess 76. Preferably, the flange 68 has a U-shaped transverse cross-section, with the opened portion of the U configuration facing upwardly toward the rearward supporting member 12. This configuration allows the recess 76 to substantially conform to the configuration of the rearward supporting member 12, so as to receive the rearward supporting member 12 therein while providing the vehicle assembly 10 with substantial strength. As shown in FIGS. 14 and 6, when the rearward supporting member 12 is received within the recess 76, the end surface 66 of the body section 64 abuts the siderail engaging surface 54 of member 12. The end surface 66 and the siderail engaging surface 54 are preferably fastened together. The fastening can be any of various appropriate devices or methods, for example, the fastening can be performed by welding.

The fastening provides structural rigidity and support to the assembly 10. Additionally, the overlapping joints, such as joint 18 and 20, provide easy alignment for the two members forming the joint, that is, members 12 and 16, as illustrated in FIG. 1. Also, the overlapping joints, such as joint 18 and 20, provide for increased contact area between the two members 12 and 16 forming the joint, which permits greater area for attachment between the members 12 and 16. For example, if the two members 12 and 16 are welded, the joint 18 provides increased area of weld between the two members 12 and 16. In particular, as seen in FIGS. 3 and 6, a fastening connection 200, such as a weld line, between member 12 and siderail 16 can extend along the entire length of the U-shaped end portion 66 and along the entire length of each of the two surfaces 72. Thus, as illustrated in FIG. 5, there can be five different surfaces or lengths of siderail 16 fastened to member 12. That is, the welded connection for the illustrated embodiment between members 12 and 16 is along both of surfaces 72, both of surfaces 60, and surface 66. Thus, as seen in FIG. 4, the connection between members 12 and 17 would is also welded along each surface 72, leaving the passageway 70 open.

Further, the overlapping joints, such as joints 18 and 20, can provide easy access to the contact area between the two members 12 and 16. For example, as illustrated in FIGS. 3 and 6, if the sections of the members 12 and 16 adjacent the contact area between the two members 12 and 16 are substantially perpendicular to each other, fastening devices have easy access to the contact area to create the connection, that is, if fastening devices are needed. For example, if the members 12 and 18 are welded together, the substantially perpendicular relationship between the sections of the members 12 and 18 adjacent the weld area 200 provides easy access for the weld gun to create the welded connection 200.

The siderail members 16 are rigidly connected at their forward ends 19 to respective left and right ends 32a, 32b of the tubular forward supporting member 14 at respective left and right overlap joints 22, 24, which can employ the same concepts described with respect to the overlap joints 30a and 30b. Preferably, the rigid connections are accomplished by fastening the overlap joints 22, 24 along engaging contact boundaries between the forward supporting member 14 and the siderails 16, respectively, as described above. For example, the fastening can be accomplished by welding.

Frame features, particularly with respect to the joints, are described in the U.S. provisional application Serial No. 60/273,949 of Barber et al. for Frame Assembly for a Motor Vehicle filed Mar. 8, 2001, the entirety of which is incorporated herein by reference.

The front joints 22 and 24 can be configured to protect the front joint from collisions with objects such as curbs 55. Since both front joints 22 and 24 as illustrated in the figures are substantially identical, only front joint 22 will be described in detail.

Figure 7:
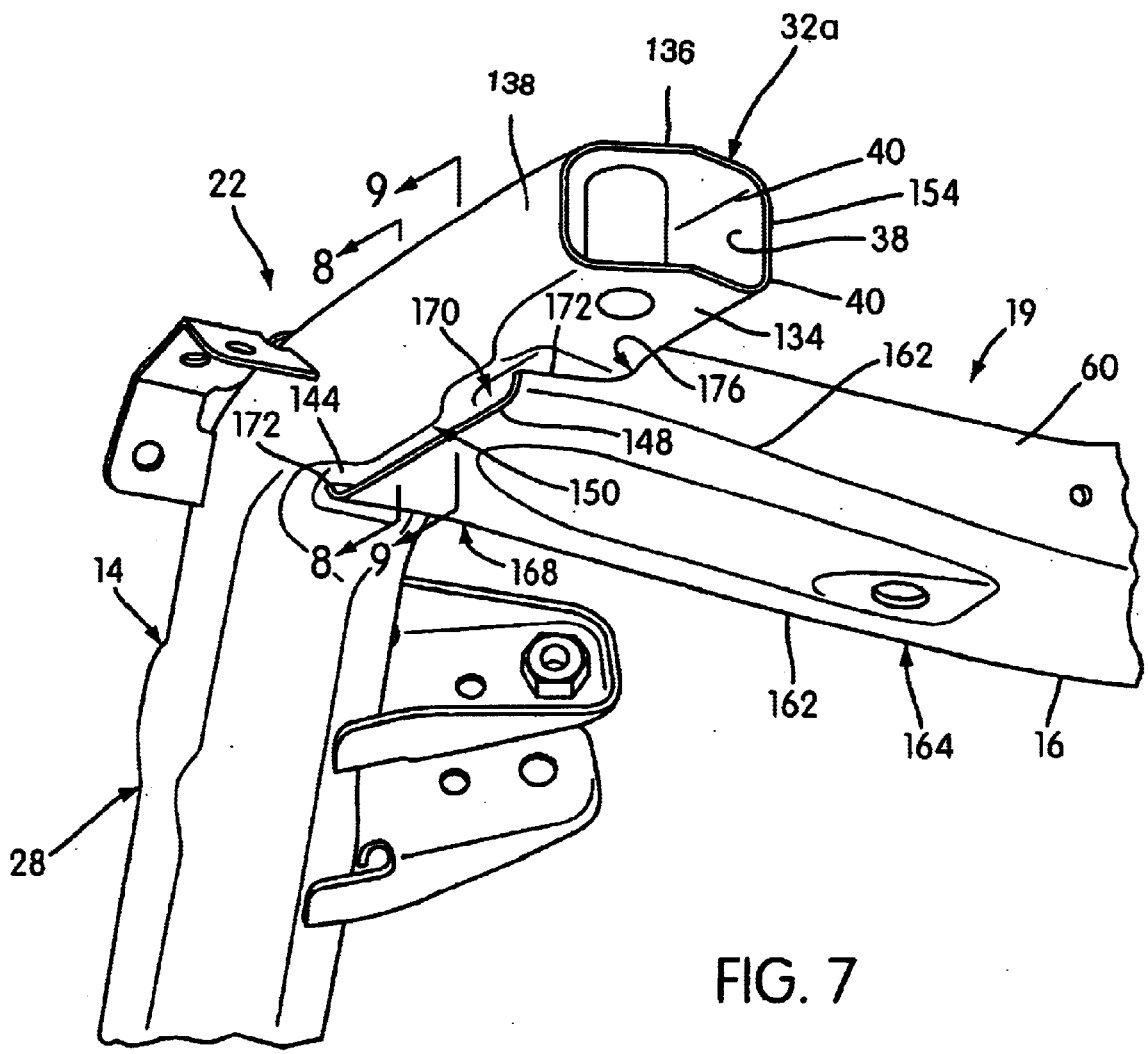
FIG. 7 is an enlarged, top, rear perspective view of one of the front overlap joints shown in the detail in FIG. 1.
Figure 8:
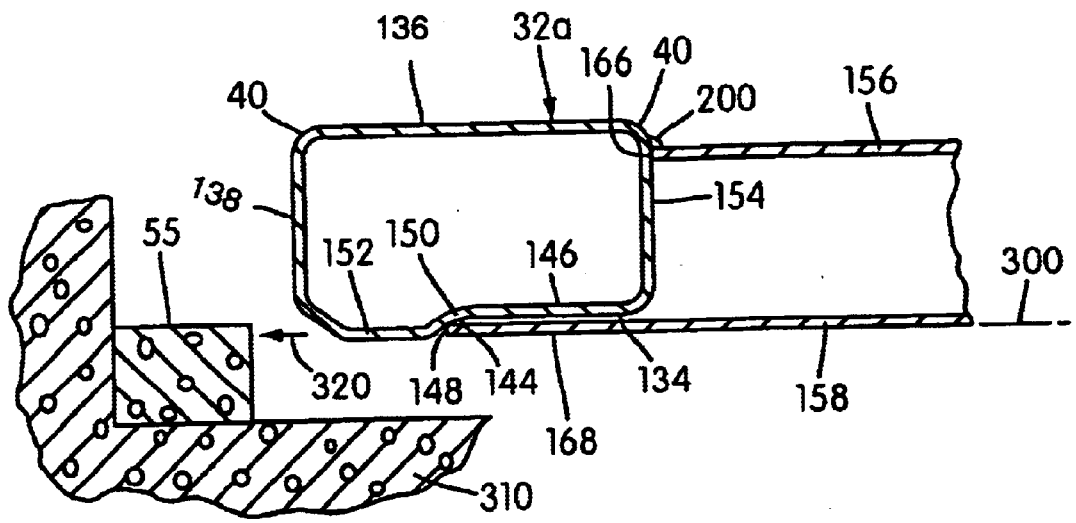
FIG. 8 is a cross-sectional view taken along line 8—8 of FIG. 7.
Figure 9:
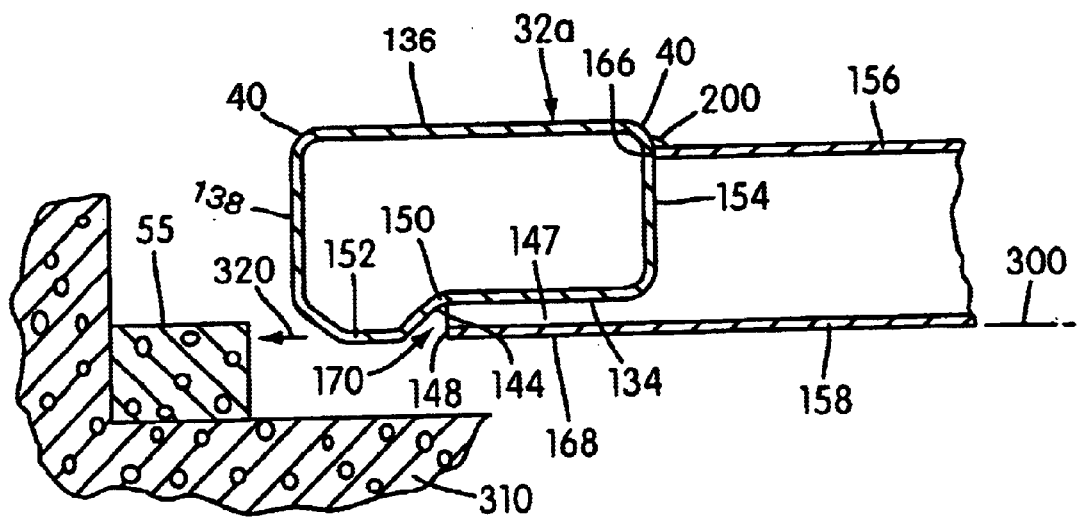
FIG. 9 is a cross-sectional view taken along line 8—8 of FIG. 7.

The front joint 22 can be formed as follows. The end surface 166 of the body section 164 and the siderail receiving surface 172 of the flange 168 cooperate to form a supporting member receiving recess or receiving cavity 176. Preferably, the flange 168 has a U-shaped transverse cross-section, with the opened portion of the U-shaped configuration facing upwardly toward the forward supporting member 14. This configuration allows the recess 176 to substantially conform to the configuration of the forward supporting member 14, so as to receive the forward supporting member 14 therein while providing the vehicle assembly 10 with substantial strength. As shown in FIGS. 7–9, when the forward supporting member 14 is received within the recess 176, the end surface 166 of the body section 164 abuts the siderail engaging surface 154. The end surface 166 and the siderail engaging surface 154 are preferably fastened together, for example by welding, as illustrated in FIGS. 8 and 9, to provide structural rigidity and support to the assembly 10.

As best shown in FIGS. 1 and 7–9, the bottom portion 134 of the end section 32b has a flange engaging surface 144 with a siderail abutting section 146 positioned inwardly of a leading edge 148 toward the hollow interior or receiving cavity of the siderail 16. A protrusion 150 extends from the siderail abutting section 146 beyond the leading edge 148 of the siderail 16 and outside of the hollow interior thereof. The protrusion 150 extends away from the siderail abutting section 146 such that a protective portion 152 thereof is positioned in a first plane 300. The first plane 300 is positioned at a predetermined distance above the ground 310.

As shown in FIGS. 1 and 7–9, the corner portions 162 can contact the flange engaging surface 144 and the protrusion 150 can contact the top portion 158 of the siderail 16 opposite of the leading edge 148 thereof so as to define an opening 170. An upper siderail receiving surface 172 of each corner portion 162 receives the siderail 16 and contacts the siderail abutting sections 146 of the flange engaging surface 144. Preferably, the siderail receiving surfaces 172 are welded to the siderail abutting sections 146 so as to effect a bond therebetween sufficient to provide structural rigidity and support to the assembly 10. Although, as discussed above with respect to the other joints 18 and 20, the fastening of the siderails 16 to the member 14 can be accomplished by any appropriate fastening mechanism or fastener.

As best illustrated in FIGS. 8–9, the protective portion 152 protects the leading edge 148 of the siderail 16 from objects, such as a curb 55, in the first plane 300 when the protective portion 152 collides with the curb 55 in a first direction 320, which corresponds to the frame 10 moving in a forward direction. Thus, when curb 55 collides with frame 10 the curb 55 contacts the protective portion 152 and the damage to the frame 10, and more specifically to the joint 22 is minimized. The protective portion 152 extends down into the plane 300 and prevents a direct collision of the curb 55 and the leading edge 148. Such a collision between the curb 55 and the leading edge 148 could cause serious damage to the frame 10 and could tear the flange 168.

The protective portion 152 or projection can be any appropriate shape to protect the leading edge 148 and can extend along the entire width of the siderail 16 or can extend only partially across the width of the siderail 16. For example, as illustrated, the protective portion 152 can be positioned generally in the center of the siderail and extend across only a portion of the width of the siderail 16.

As shown in FIG. 9, the opening 170 spaces the lower portion 158 from the flange receiving surface 144, which in turn, defines a passageway 174. The passageway 174 extends between the opening 170 and the hollow interior of the siderail 16 to allow fluids, such as coatings, to pass from the interior of the siderail 16 through the opening 170 during manufacturing of the frame 10.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

We claim:

1. A frame assembly for a motor vehicle, comprising:

a first frame member having a first surface facing a first direction and a second surface facing a second direction, and said first frame member extending in a first frame member longitudinal direction; and an overlapping frame member extending in an overlapping frame member longitudinal direction and being rigidly secured to said first frame member such that said first frame member extends generally transverse to said overlapping frame member and the first frame member longitudinal direction extends generally transverse to the overlapping frame member longitudinal direction, said overlapping frame member having a first section and a flange protruding from said first section, said first section and said flange of said overlapping frame forming a recess having a shape corresponding to said first and second surfaces of said first frame member, said first frame member being received within said recess and mating with said first section and said flange of said overlapping frame member, said first section of said overlapping frame member abutting said first surface of said first frame member and said flange of said overlapping frame member overlapping and contacting said second surface of said first frame member, said overlapping frame member having a hollow interior, said flange having an end forming an opening communicating with said hollow interior, and said flange and said first frame member forming a passageway extending across said first frame member and between said opening and said hollow interior of said overlapping frame member.

2. An assembly according to claim 1, wherein said first frame member is a hydroformed member defined by an irregularly outwardly deformed tubular metallic wall fixed into a predetermined irregular exterior surface configuration; and said overlapping frame member is a hydroformed member defined by an irregularly outwardly deformed tubular metallic wall fixed into a predetermined irregular exterior surface configuration.

3. An assembly according to claim 1, wherein said first frame member is an upper frame member, and said overlapping frame member is a lower frame member.

4. An assembly according to claim 1, wherein each of said first section and said flange of said overlapping frame member has spaced contact areas attached to said first frame member.

5. A frame assembly for a motor vehicle, comprising:

a first frame member having a first surface facing a first direction and a second surface facing a second direction; and an overlapping frame member rigidly secured to said first frame member and having a first section and a flange protruding from said first section, said first section and said flange of said overlapping frame forming a recess having a shape corresponding to said first and second surfaces of said first frame member, said first frame member being received within said recess and mating with said first section and said flange of said overlapping frame member, said first section of said overlapping frame member abutting said first surface of said first frame member and said flange of said overlapping frame member overlapping and contacting said second surface of said first frame member, said overlapping frame member having a hollow interior, said flange having an end forming an opening communicating with said hollow interior, and said flange and said first frame member forming a passageway extending across said first frame member and between said opening and said hollow interior of said overlapping frame member, said flange has a leading edge facing in a first direction, and said first member has a protrusion extending outside of said recess, with a portion of said protrusion positioned in front of said leading edge of said flange to protect said leading edge from objects approaching said leading edge in a second direction, which is opposite said first direction.

6. An assembly of supporting members for a motor vehicle, comprising:

an upper member having a first surface and an opposite, second surface; and a lower member coupled to said upper member, said lower member having a central portion and a flange extending from said central portion in a first direction and forming an upwardly-open receiving cavity in said lower member, said flange having a leading edge lying in a first plane and facing towards said first direction, said upper member being positioned within said cavity of said lower member, said second surface of said upper member having a first section positioned within said cavity and overlapping said flange while being spaced from said first plane and a protrusion extending beyond said leading edge outside said receiving cavity with a portion of said protrusion positioned in said first plane to protect said leading edge from objects within said first plane and approaching said leading edge in a second direction, which is opposite said first direction.

7. An assembly according to claim 6, wherein said upper member is a hydroformed tubular member defined by an irregularly outwardly deformed tubular metallic wall fixed into a predetermined irregular exterior surface configuration; and said lower member is a hydroformed tubular member defined by an irregularly outwardly deformed tubular metallic wall fixed into a predetermined irregular exterior surface configuration.

8. An assembly according to claim 6, wherein said upper member is an integral, one-piece element.

9. An assembly according to claim 6, wherein each of said upper and lower members is an integral, one-piece element.

10. An assembly according to claim 6, wherein said central portion of said lower member abuts said first surface of said upper member and said central portion and said flange forming said cavity with said cavity having a shape corresponding to said upper member to receive and mate with said upper member.

11. An assembly according to claim 6, wherein said portion of said protrusion lies in said first plane and does not extend below said first plane.

* * * * *